UNITED STATES PATENT OFFICE.

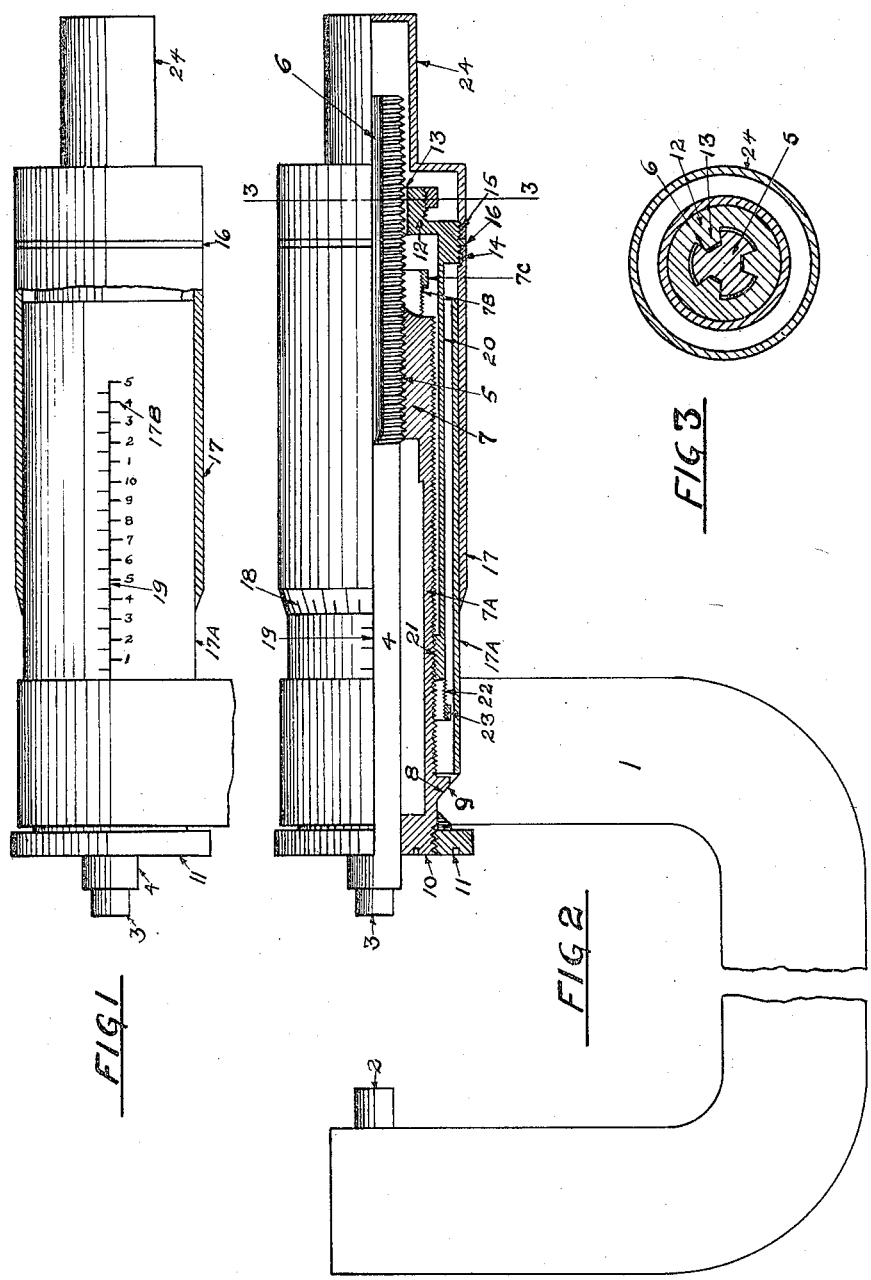

ANGUS T. BLUSH, OF ERIE, PENNSYLVANIA.

MICROMETER.

1,311,548.　　　　　Specification of Letters Patent.　　Patented July 29, 1919.

Application filed August 1, 1918. Serial No. 247,873.

*To all whom it may concern:*

Be it known that I, ANGUS T. BLUSH, a citizen of the United States, residing at Erie, in the county of Erie and State of Pennsylvania, have invented new and useful Improvements in Micrometers, of which the following is a specification.

This invention relates to micrometers and consists in certain improvements in the construction thereof as will be hereinafter fully described and pointed out in the claims.

The invention is illustrated in the accompanying drawings as follows:—

Figure 1 shows an elevation, partly in section, of the operating handle.

Fig. 2 an elevation, partly in section, of the micrometer.

Fig. 3 a section on the line 3—3 in Fig. 2.

1 marks the frame, 2 the stationary point and 3 the movable point.

The movable point has a stem 4 terminating in a screw-threaded end 5. The screw threaded end is provided with a number of radial grooves 6.

The screw threaded end 5 operates in a nut 7. The nut or head is carried by a sleeve 7ª. The sleeve 7ª has a beveled shoulder 8 which rests on a beveled shoulder 9 on the frame. A screw threaded end 10 extends through the frame and a nut 11 draws the shoulder 8 into engagement with the seat 9 so as to clamp the sleeve 7ª and consequently the nut with the frame 1.

A head 12 is slidingly mounted on the screw threaded end 5. It has a series of projections, or splines 13, which extend into the grooves 6 and these form locking surfaces which lock the head 12 against rotative movement on the end 5. The head has the screw threads 14—15 on its outer periphery. These are separated by a shoulder 16. An indicating sleeve 17 is screwed on to the thread 14 and is set up against the shoulder 16. The sleeve is rotatively mounted on a sleeve 17ª, the sleeve 17ª having a zero marking 19 running lengthwise of the sleeve and the sleeve 17 having graduations 18 preferably fifteen of them extending circumferentially along its lower end and in position to operate in connection with the zero marking 19 and indicating a reading of the micrometer as to the fractional distances between the points.

By turning the sleeve 17 the head 12 is turned and with it the screw end 5. The turning of the screw moves the point 3 toward and from the point 2, the rotative position being indicated, as before stated, by the graduations 18. I prefer to make the screw 5 of greater pitch than is commonly used in micrometers and to make a greater distance between the points 2 and 3 than is common and where this is done the longitudinal movement of the sleeve 17 on the sleeve 17ª would have to be followed by a movement of the screw greater than would be convenient. To overcome this feature of inconvenience I provide the following mechanism:—The sleeve 20 extends from the head 12 and is provided with an internal screw thread 21 which operates on an external screw thread on the sleeve 7ª. The screw thread 21 is half the pitch of the thread on the screw 5 and consequently the movement of the sleeve 17 is just half the movement of the point. Sleeve graduations 17ᵇ are arranged on the sleeve 17ª in position to be uncovered by the end of the sleeve 17 as it is moved longitudinally through the action of the screw 21 and this registers the position of the points, the graduations being arranged to read correctly with relation to the movement of the point 3. In order to assure a tight fit of the threads 5 and 21 a slotted end 7ᵇ is arranged on the nut 7 and a nut 7ᶜ provided by means of which the screw may be slightly contracted and a slotted end 22 extends from the sleeve 20 and is provided with a nut 23 by which the sleeve may be slightly contracted.

A cap 24 is carried by the head 12 being screwed on to the screw thread 15.

It will be observed that the micrometer may be adjusted by loosening the nut 11 and turning the sleeve 7ª and nut 7. This will move the point 3 one way or the other slightly without a movement of the sleeve 17 or a change of the graduations.

The general operation of the micrometer will be plain from the foregoing description.

By turning the sleeve 17 the thread 5 is operated and the point 3 moved in and out and the screw 21 is operated moving the sleeve 17 forward and back over the graduations 17ᵇ. The graduations 17ᵇ give the general distances and the circumferential graduations the fractional readings as is common with micrometers.

What I claim as new is:—

1. In a micrometer, the combination of a frame provided with two points one of which is movable relatively to the frame; a screw actuating the movable point; an indicating sleeve actuating said screw; and a screw controlling the movement of the sleeve, the screws having different pitches.

2. In a micrometer, the combination of a frame provided with two points one of which is movable relatively to the frame; a screw actuating the movable point; an indicating sleeve actuating said screw; and a screw controlling the movement of the sleeve, the screws having different pitches, the last mentioned screw having a less pitch than the first mentioned screw.

3. In a micrometer, the combination of a frame provided with two points one of which is movable relatively to the frame; a screw stem extending from the movable point and having a locking surface; a screw threaded head co-acting with the screw stem; a locking head operating on the locking surface of the stem; and means for actuating one of the heads to actuate the point.

4. In a micrometer, the combination of a frame provided with two points one of which is movable relatively to the frame; a screw stem extending from the movable point and having a locking surface; a screw threaded head actuating the stem; a locking head operating on the stem and locked against rotation thereon by the locking surface; and means for actuating the locking head to actuate the stem.

5. In a micrometer, the combination of a frame; a screw head locked with the frame; a point movable relatively to the frame and having a screw threaded stem operating in the screw head; a locking head operating on the stem to operate said stem; a sleeve carried by the locking head; and graduated means co-acting with the sleeve for indicating the position of the movable point.

6. In a micrometer, the combination of a frame; a screw head; a sleeve carrying the screw head and secured to the frame; a point movable relatively to the frame; a screw threaded stem on the movable point operating in the screw head; a locking head slidingly mounted on the stem and locked against rotation thereon; a screw connection between the sleeve carrying the screw head and the locking head, said screw connection having a different pitch than the screw thread on the stem; a graduated sleeve carried by the locking head; and graduated means co-acting with the sleeve for indicating the position of the movable point.

7. In a micrometer, the combination of a frame; a point movable relatively to the frame; a screw stem on the point; a nut for the stem, said nut being rotatively mounted in the frame; means for locking the nut on the frame; devices for actuating the stem; and graduated means co-acting with said devices, said graduated means being adapted to remain stationary as the nut is adjusted.

8. In a micrometer, the combination of a frame; a point movable relatively to the frame; a screw stem on the movable point and a nut for operating the same; a sleeve extending from the nut to the frame, said sleeve being rotatively mounted in the frame; means for clamping the sleeve with the frame; and means for operating the screw stem and indicating the position of the movable point.

In testimony whereof I have hereunto set my hand.

ANGUS T. BLUSH.

Copies of this patent may be obtained for five cents each, by addressing the "Commissioner of Patents, Washington, D. C."